(12) United States Patent
Schmitt et al.

(10) Patent No.: US 11,437,670 B2
(45) Date of Patent: Sep. 6, 2022

(54) BATTERY MODULE HAVING A FLOW-DIRECTING CONFIGURATION IN THE MODULE HOUSING

(71) Applicant: Röchling Automotive SE & Co. KG, Mannheim (DE)

(72) Inventors: Andreas Schmitt, Herrnsheim (DE); Rana Muhammad Humza, Dettenheim (DE); Juliane Nies, Bonn (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 62 days.

(21) Appl. No.: 15/994,602

(22) Filed: May 31, 2018

(65) Prior Publication Data

US 2018/0358672 A1 Dec. 13, 2018

(30) Foreign Application Priority Data

Jun. 7, 2017 (DE) ...................... 10 2017 209 604.7

(51) Int. Cl.
*H01M 10/6562* (2014.01)
*H01M 50/20* (2021.01)
(Continued)

(52) U.S. Cl.
CPC ..... *H01M 10/6562* (2015.04); *H01M 10/613* (2015.04); *H01M 10/625* (2015.04);
(Continued)

(58) Field of Classification Search
CPC ............. H01M 10/65; H01M 10/6562; H01M 10/6566; H01M 10/613; H01M 10/625;
(Continued)

(56) References Cited

U.S. PATENT DOCUMENTS 6,445,582 B1 9/2002 Oda et al.
8,865,332 B2 10/2014 Yang et al.
(Continued)

FOREIGN PATENT DOCUMENTS

CN 1905268 A 1/2007

OTHER PUBLICATIONS

German Search Report for corresponding DE 10 2017 209 604.7 dated Jan. 15, 2018, 11 pgs.
(Continued)

*Primary Examiner* — William E McClain
*Assistant Examiner* — Kirsten B Tysl
(74) *Attorney, Agent, or Firm* — Rankin, Hill & Clark LLP

(57) ABSTRACT n a battery module, having a module housing in which a plurality of battery cells are arranged in such a way that a flow space is formed between each two adjacent battery cells and/or between a peripheral battery cell and a wall portion, adjacent to the peripheral battery cell, of the module housing, through which space a cooling fluid can flow for convective cooling of the battery cells, the module housing having an admission opening for admitting cooling fluid into the module housing, and a discharge opening, different from the admission opening, for discharging cooling fluid from the module housing, there is provided, in an inflow region between the admission opening and the plurality of battery cells, a flow-directing configuration that subdivides the inflow region at least locally into different flow regions.

11 Claims, 2 Drawing Sheets

(51) Int. Cl.
*H01M 10/613* (2014.01)
*H01M 10/625* (2014.01)
*B60R 16/04* (2006.01)

(52) U.S. Cl.
CPC ............ *H01M 50/20* (2021.01); *B60R 16/04* (2013.01); *H01M 2220/20* (2013.01)

(58) Field of Classification Search
CPC ............ H01M 10/6556; H01M 50/20; H01M 2220/20; B60R 16/04
See application file for complete search history.

(56) References Cited

U.S. PATENT DOCUMENTS

| | | | |
|---|---|---|---|
| 2007/0026301 A1 | 2/2007 | Lee et al. | |
| 2010/0326750 A1* | 12/2010 | Murakami | H01L 23/473 180/65.31 |
| 2012/0183822 A1* | 7/2012 | Chung | H01M 10/617 429/72 |
| 2013/0280575 A1 | 10/2013 | Obrist et al. | |
| 2018/0248239 A1* | 8/2018 | Nam | H01M 10/6566 |

OTHER PUBLICATIONS

Chinese Office Action for corresponding CN 201810488847.7 dated Jan. 24, 2022, 8 pgs.
Espacenet Bibliographic data:CN1905268 (A), Published Jan. 31, 2007, 1pg.

* cited by examiner

BATTERY MODULE HAVING A FLOW-DIRECTING CONFIGURATION IN THE MODULE HOUSING

The present invention relates to a battery module, having a module housing in which a plurality of battery cells are arranged in such a way that a flow space is formed between each two adjacent battery cells and/or between a peripheral battery cell and a wall portion, adjacent to the peripheral battery cell, of the module housing, through which space a cooling fluid can flow for convective cooling of the battery cells, the module housing having an admission opening for admitting cooling fluid into the module housing, and a discharge opening, different from the admission opening, for discharging cooling fluid from the module housing.

BACKGROUND OF THE INVENTION

Battery modules of this kind are used principally in vehicles in order to supply them, along with all the electrically operated accessories therein, with sufficient electrical energy.

WO 2012/056276 A1 discloses a temperature-controlled battery module in which the interior of the module housing is subdivided into different housing zones, called "battery chambers," in each of which a plurality of battery cells are arranged. The battery cells are arranged in such a way that a flow space through which a cooling fluid is to flow is formed between adjacent battery cells and between a peripheral battery cell and a wall portion, located opposite it, of the module housing.

A series of miniature pumps are arranged on the upper side of the battery cells, i.e. between the upper side of the battery cells and a cover of the module housing, in order to ensure a quantitative flow of cooling fluid required for sufficient convective cooling of the battery cells.

The known battery module furthermore comprises a conduit coil, provided in a partition wall of the battery chambers, through which a further cooling medium can flow in order to withdraw heat from the cooling fluid circulated by the miniature pumps in the battery module. Two cooling circuits therefore exist: a first cooling fluid circuit in which cooling fluid enclosed in the battery housing withdraws heat from the battery cells, and a second cooling medium circuit that withdraws heat from the cooling fluid by heat transfer to the cooling medium in the conduit coils and discharges it outside the module housing.

With this known battery module, the cooling medium that discharges heat to the exterior of the module housing is different from the cooling fluid that convectively withdraws heat from the battery cells. The construction of the known battery module is complex, not least because of the numerous miniature pumps required for circulation of the cooling fluid enclosed in the module housing.

With increasing power demands from the electrical loads connected to the battery module, the thermal load on the battery cells and thus on the battery module, and consequently the latter's cooling requirement, become greater. It is important in this regard not only to withdraw sufficient heat from the battery module as a whole, but also to cool the battery cells contained therein as uniformly as possible, so that the optimum power level obtained from all the battery cells is as consistent as possible. It is thereby possible to avoid "hot spots," i.e. extreme local heating, which can damage the battery cells or even destroy them, for example due to combustion.

In the existing art, furnishing globally sufficient cooling often involves the brute-force approach of increasing the quantitative flow of the cooling fluid flowing through the flow spaces between the battery cells and between the battery cells and a wall portion of the module housing. More mass transport as a rule also means more heat transport.

This still does not, however, solve the problem of homogeneous cooling or maximally homogeneous flow distribution of the cooling fluid flow through all the flow spaces that are present. In addition, the cooling performance to be expected as a result of the increase in quantitative flow will probably not increase linearly with the quantitative flow, since flow losses increase in proportion to the square of the respective local flow velocity, and the cross sections through which flow occurs are defined by the design of the battery module and of its battery cells. If there is no change in the flow cross sections, for example, doubling the quantitative flow therefore results in a doubling of the flow velocities present in the respective cross sections and thus in a quadrupling of the flow losses occurring in the cross sections.

With an increase in quantitative flow, either the pump output required rises disproportionately and/or the convective cooling effect of the elevated quantitative flow decreases due to the flow losses that occur, since losses generally dissipate in the form of heat.

SUMMARY OF THE INVENTION

An object of the present invention is therefore to achieve, with a low volumetric flow, effective and homogeneous cooling of a battery module of the kind recited initially.

This object, and others, is achieved according to the present invention by a battery module, having the features recited initially, in which there is additionally provided, in an inflow region between the admission opening and the plurality of battery cells, a flow-directing configuration that subdivides the inflow region at least locally into different flow regions.

The result of arranging the flow-directing configuration in the aforesaid inflow region is that cooling fluid flowing into the module housing can be directed as necessary to the individual battery cells or to different battery cell groups, which is advantageous in terms of homogenizing the cooling fluid flow through the individual flow spaces of the battery module.

In addition, because of the constrained guidance of the cooling fluid flow in the region of the flow-directing configuration in the inflow region, little or no increase is required in the quantity of cooling fluid flowing per unit time (mass flow or volumetric flow), since the cooling fluid, constrainedly guided in terms of fluid mechanics by the flow-directing configuration, becomes directed to where it is actually needed. An inhomogeneous flow distribution that is established in the same module housing having no flow-directing configuration in the inflow region, with a maximum quantitative flow where the flow resistance is lowest and a minimum where the flow resistance is highest, can be avoided. Given otherwise identical physical circumstances, the flow resistances can differ simply because the flow paths have different lengths. This means that the flow loss of a fluid flow is also path-dependent.

The term "quantitative flow" is used here as a generic term for "volumetric flow" and "mass flow." When the cooling fluid is an incompressible cooling liquid, the mass flow and volumetric flow are in any case proportional to one another and are linked by way of the approximately constant density of the cooling liquid. The proportionality also exists in principle when the cooling fluid is a gas, but the density of the gas depends greatly on the operating state of the battery module, in particular on the temperature and pressure of the gas in the module housing. It is notable, however, that heat is always convectively discharged directly from the mass of the cooling fluid, not from its volume.

Although the provision in turn of a flow-directing configuration for constrained guidance of a cooling fluid flow in an outflow region, located after the flow spaces in a flow-through direction of the flow spaces, is not to be excluded, this further flow-directing configuration is dispensable because the cooling fluid in the outflow region has already flowed past the battery cells and does not flow past them again. Because the cooling fluid temperature in the outflow region will still be below the temperature of the battery cells, heat transfer from the battery cells to the cooling fluid can still occur in the outflow region. The magnitude of that transfer is, however, substantially less than the thermal transfer during flow past the battery cells, i.e. as flow occurs through the flow spaces. As a result of the thermal transfer achieved from the battery cells to the cooling fluid based on the constrained flow as flow occurs through the flow spaces, the cooling fluid in the outflow region as a rule does not need to absorb further heat from battery cells.

In order to avoid unnecessary complexity in terms of structure and installation, it is therefore preferred if a flow-directing configuration is provided only in the inflow region of the battery module, the outflow region instead being furnished only as a collecting space between the battery cells and the discharge opening after flow has occurred through the flow spaces.

It is furthermore conceivable for the flow-directing configuration to extend only in a region that begins, in a flow incidence direction leading from the admission opening to the battery cells, at a distance from the admission opening, and ends at a distance from the battery cells, so that the cooling fluid flow can flow in unguided fashion for a brief stretch between the downstream end of the flow-directing configuration, referring to the flow incidence direction defined above, and the battery cells.

In order to be able to ensure maximally reliable guidance of the cooling fluid flow to the battery cells, however, provision is preferably made that the flow-directing configuration extends from an initial region, located closer to the admission opening, to the plurality of battery cells.

The flow-directing configuration can therefore touch one or more battery cells at its downstream end with reference to the flow incidence direction, so that one or more flow spaces that are associated with a flow region constituted by the flow-directing configuration directly adjoin that flow region in terms of fluid mechanics. A portion of a battery cell which delimits a flow space can thus adjoin, preferably without a gap, a flow-directing wall of the flow-directing configuration in the flow incidence direction.

Cooling fluid can be directed into different regions of the module housing as a result of the flow regions constituted by the flow-directing configuration, which end in different regions of the module housing in the downstream longitudinal end region of the flow-directing configuration. To ensure that successful cooling with a maximally homogeneous cooling effect over all the battery cells can in fact be achieved by way of the flow-directing configuration, according to an advantageous refinement of the present invention provision is made that a plurality of flow regions have associated with them a predetermined number of flow spaces that correlate with the associated flow region in terms of fluid mechanics in such a way that the cooling fluid flowing through the associated flow region can flow through them.

It is advantageous in this context if the association of flow spaces with a flow region is as unequivocal as possible, which is the case specifically when the number of flow spaces which are associated with one flow region adjoin the flow region of the flow-directing configuration in gap-free fashion.

Although, as presented above, the possibility of a cooling fluid flow without constrained guidance between the downstream end of the flow-directing configuration and the battery cells, and thus the possibility that cooling fluid that has flowed through a flow region other than the associated one might flow, even to a small extent, through flow spaces associated with a flow region, are not to be excluded, in order to achieve unequivocal flow conditions it is nevertheless advantageous if it is the case, for at least one flow region, that the flow spaces associated with that flow region can have flowing through them only the cooling fluid flowing through the respective flow region.

Because maximally effective conveyance of cooling fluid to respective flow spaces can be achieved with a maximally well-separated allocation of flow spaces to a flow region, the condition recited in the preceding paragraph preferably exists for at least a plurality of the flow regions, particularly preferably for all flow regions.

It is conceivable in principle, in order to furnish approximately uniform flow resistances for all the flow regions and all the flow spaces associated with them, to associate different numbers of flow spaces with different flow regions. In order to furnish uniform flow conditions, however, provision is preferably made that at least two, preferably more than two, particularly preferably all the flow regions have the same number of flow spaces respectively associated with them.

Preferably the admission opening is provided in the module housing in the bottom region, and the discharge opening is provided in a top region, of the module housing, so that the cooling fluid flows through flow spaces against gravity. This need not be the case, however. For very general clarification: in accordance with a preferred embodiment of the present invention the battery cells of a battery module are of substantially the same design and are configured as flat battery cells, i.e. they have a substantially larger dimension in two mutually perpendicular spatial directions than in a thickness direction orthogonal to each of the two spatial directions. Battery cells adjacent to one another in a thickness direction are preferably arranged substantially parallel to one another; several rows of battery cell packets can be provided alongside one another in a module housing, and their battery cells in each packet can be arranged one behind another in a stacking direction parallel to their thickness direction. Very generally, therefore, the admission opening is preferably arranged on one side of the battery cells and the discharge opening is arranged on the respective other side of the battery cells, so that the discharge opening can be reached by cooling fluid that has flowed through the admission opening into the module housing only after flowing through the flow spaces formed between the battery cells themselves and between peripheral battery cells and a wall portion of the module housing.

Because the flow cross section of the admission opening as a rule will be substantially smaller than the cross section of the module housing in the housing region in which the battery cells are received, a principal problem in terms of homogenizing flow through the individual flow spaces involves sufficiently uniform distribution of the cooling fluid flow from the admission opening, having a small cross section, to the flow spaces in the module housing in a housing region, having a large cross section, which receives the battery cells. That distribution of the cooling fluid flow entering the module housing through the admission opening, over the large area of the arrangement of battery cells over a shortest possible flow path in the flow incidence direction, can be achieved by the fact that the flow-directing configuration comprises at least two flow-directing walls diverging, in a flow incidence direction, from the admission opening toward the plurality of battery cells.

With two flow-directing walls, and including portions of the wall of the module housing in the inflow region, it is possible to constitute three flow regions, namely a first flow region between a first wall portion and a first flow-directing wall, a second flow region between the first and the second flow-directing wall, and a third flow region between the second flow-directing wall and a second wall portion of the module housing which is located opposite the first one in a direction orthogonal to the flow incidence direction.

The greater the number of flow-directing walls, the more flow regions that can be defined; with an increasing number of flow-directing walls, the number of flow spaces associated with a flow region becomes smaller, so that a cooling fluid flow can be directed very accurately onto the flow spaces in a desired quantitative flow range. The flow-directing configuration therefore preferably comprises more than two diverging flow-directing walls.

The diverging flow-directing walls preferably extend orthogonally to the flow incidence direction and diverge in the flow incidence direction. Also preferably, they extend over the entire inflow region, from a wall portion of the module housing which delimits the inflow region to a further wall portion of the module housing which is located orthogonally oppositely to that portion.

For clarification: flow-directing walls are to be considered "diverging" if their spacing from one another becomes progressively larger in the flow incidence direction, or if the flow-directing walls at least have, at the downstream longitudinal end region of the flow-directing configuration, a greater spacing from one another than at the upstream longitudinal end region. According to the second alternative above, the possibility that diverging flow-directing walls also have portions parallel to one another is not excluded.

The aforementioned oppositely located wall portions of the module housing, which delimit the inflow region of the module housing and between which the diverging flow-directing walls of the flow-directing configuration extend, preferably extend parallel to the flow incidence direction.

Additionally or alternatively, the flow-directing configuration can also comprise flow-directing walls that extend in a direction from the admission opening to a wall portion, located oppositely from the admission opening in a flow incidence direction, of the module housing. These flow-directing walls also can diverge so that a cooling fluid flow that enters through the admission opening is distributed over the largest possible flow incidence area by the time the battery cells are reached.

In order to be able to furnish reliable divergence of the flow-directing walls simultaneously with reliable flow guidance, provision can be made that at least one flow-directing wall, preferably a plurality of flow-directing walls, by preference all the flow-directing walls, has/have a thickness that is constant in the flow incidence direction. In order to decrease flow resistance at the inflow point, the flow-directing walls can taper to a point oppositely to the flow incidence direction at their upstream longitudinal end and can have, for example, a blade-like conformation.

In experiments, it has furthermore proven to be advantageous to use flow-directing walls that are profiled in a very specific manner in the flow incidence direction, i.e. in such a way that at least one flow-directing wall, preferably a plurality of flow-directing walls, by preference all the flow-directing walls, has/have a thickness that firstly increases in the flow incidence direction and decreases again after reaching a maximum thickness.

For example, the flow-directing walls can have a lens-shaped cross section or an elliptical cross section, the axis extending in the flow incidence direction being considerably longer than the minor axis extending orthogonally thereto, preferably being at least three times longer than the minor axis, particularly preferably being at least five times as long as the minor axis orthogonal to the flow incidence direction.

The "flow incidence direction" is to be understood here as a local flow direction that points in different absolute spatial directions as a result of unavoidable flow deflection and flow expansion in the module housing at different locations in the module housing.

The flow-directing configuration can comprise at least two flow-directing sub-configurations, separate from one another, each of which can be embodied as discussed above.

For example, the flow-directing sub-configurations can be provided successively in a flow incidence direction, a flow-directing sub-configuration located closer to the admission opening having, for example, a smaller number of flow-directing walls than a further flow-directing sub-configuration provided farther away from the admission opening in a flow incidence direction, in order to achieve firstly, with the first flow-directing sub-configuration, a first approximate constrained guidance of the cooling fluid flow, which is distributed, finely controlled by the second flow-directing sub-configuration, onto the individual battery cells. For example, the first flow-directing sub-configuration can comprise flow-directing walls having a thickness that increases and then decreases in the flow incidence direction, in particular having a lens-shaped or elliptical cross section, and the second flow-directing sub-configuration can have flow-directing walls having a constant thickness.

It is also conceivable for the two flow-directing sub-configurations that follow one another in a flow incidence direction each to have diverging flow-directing walls, in which context the respective divergence directions of the flow-directing sub-configurations can be different, preferably can be orthogonal. For example, a flow-directing sub-configuration arranged farther upstream can diverge the cooling fluid flow, i.e. spread it out, in a width direction of the module housing and/or of the battery cells, and a flow-directing sub-configuration arranged farther downstream can diverge the cooling fluid flow in a longitudinal direction of the module housing and/or in a stacking direction of the battery cells. The width direction of the battery cells is preferably identical to the width direction of the module housing. The longitudinal direction of the module housing is also preferably identical to the stacking direction of the battery cells.

The flow-directing walls having a constant thickness can be embodied in particular in a manner that is curved and/or angled around an axis of curvature orthogonal to the flow incidence direction, in order to allow a cooling fluid flow to be diverted as necessary.

Because the preferred application of the battery module described above is utilization thereof in a vehicle V, the present invention likewise relates to a vehicle V having a battery module according to one of the claims.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
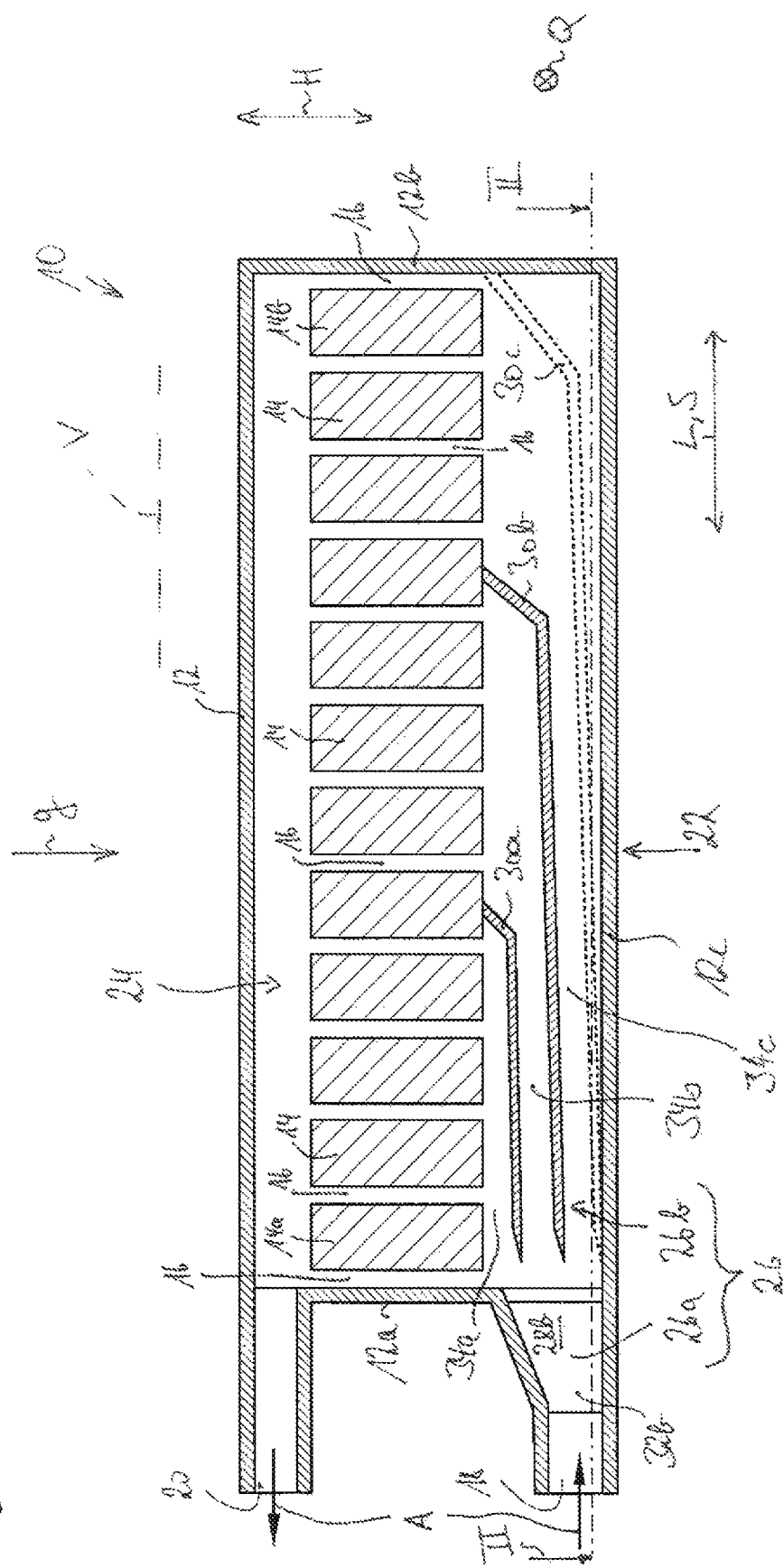
FIG. 1 is a schematic longitudinal section view of an embodiment according to the present invention of a battery module.

Referring now to the drawings wherein the showings are for the purpose of illustrating preferred and alternative embodiments of the invention only and not for the purpose of limiting the same, shown in FIG. 1 is an embodiment according to the present invention of a battery module that is labeled generally with the number 10. In the example depicted, the section plane of FIG. 1 is located parallel to the direction of gravity g.

Battery module 10 encompasses a module housing 12 having therein battery cells 14 arranged substantially parallel to one another and one behind another with a spacing from one another in a stacking direction S. The peripheral battery cells among battery cells 14 are labeled 14a at one longitudinal end of the row of battery cells, and labeled 14b at the opposite longitudinal end.

Figure 2:
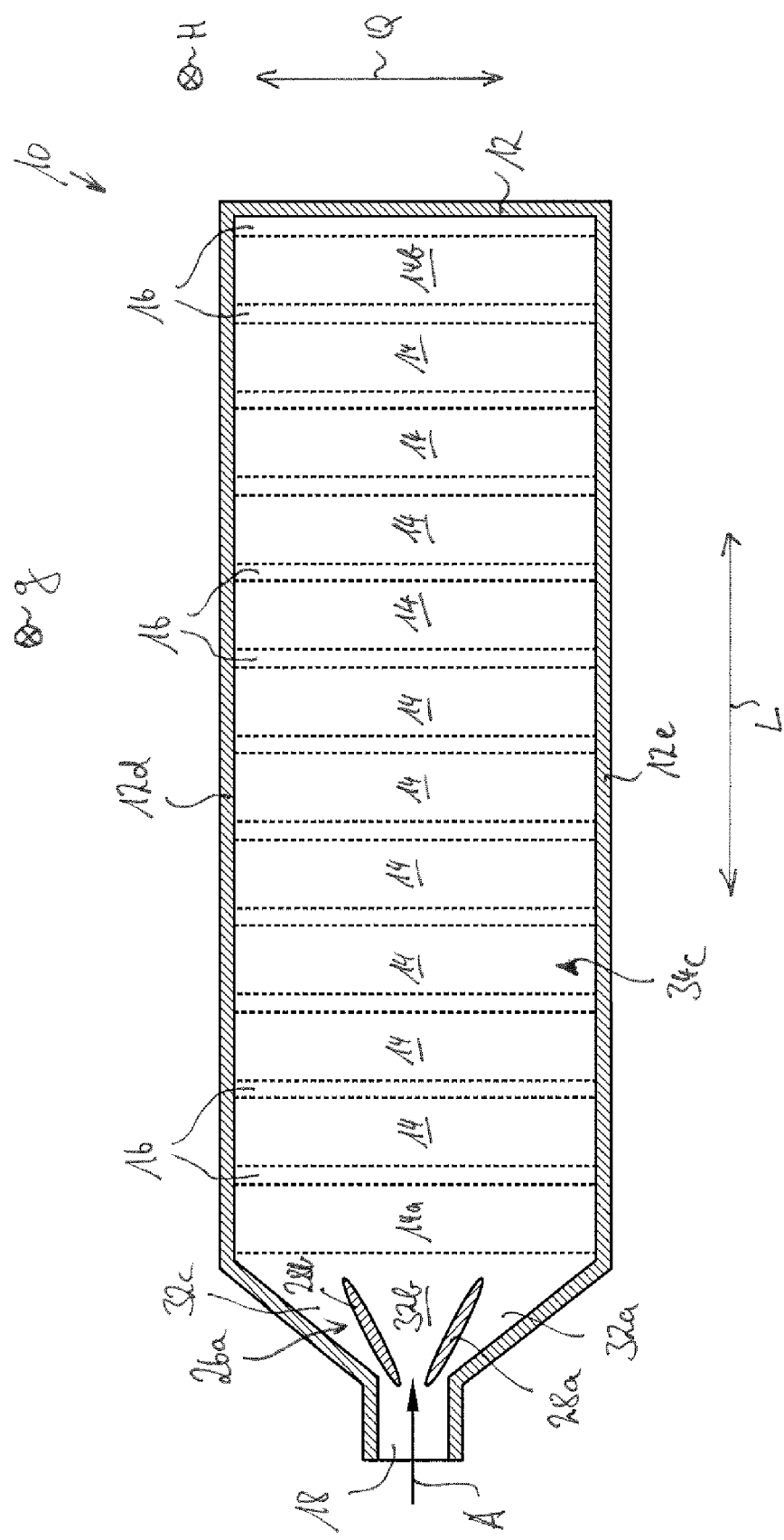
FIG. 2 is again a schematic longitudinal section view along a section plane II-II of FIG. 1, rotated 90° relative to the section plane of FIG. 1.

As is apparent from FIG. 2, in which battery cells 14, 14a, 14b that are in fact located above the drawing plane of FIG. 2 are drawn with dashed lines for better orientation of the viewer, battery cells 14, 14a, and 14b each extend at their transverse ends as far as module housing 12. Constituted between each two battery cells 14 or 14a and 14 or 14 and 14b, adjacent to one another in stacking direction S, is a respective flow space 16 through which cooling fluid can flow for convective cooling of battery cells 14, 14a, and 14b. A respective flow space 16 is likewise constituted between peripheral battery cells 14a and 14b and those respective wall portions 12a and 12b of module housing 12 which are located opposite them.

A cooling fluid can be admitted into module housing 12 through an admission opening 18, and after flowing through flow spaces 16—in the present example, against the direction of gravity g—the cooling fluid can be discharged again out of housing 12 through a discharge opening 20. The cooling fluid, which becomes heated as intended while flowing through flow spaces 16, can be cooled outside module housing 12 at a heat exchanger so that after said cooling, it is once again ready for convective cooling of battery cells 14, 14a, and 14b and can be admitted again through admission opening 18 into module housing 12. Preferably the cooling fluid is pumped around in a circuit. Module housing 12 preferably has only one cooling fluid flowing through it. An inflow region 22 is formed in module housing 12 from admission opening 18 to battery cells 14, 14a, and 14b, i.e. as far as the upstream longitudinal end (in flow incidence direction A) of flow spaces 16. An outflow region 24 is similarly formed in battery module 10 between battery cells 14, 14a, and 14b and discharge opening 20, i.e. between the downstream longitudinal end (in flow incidence direction A) of flow spaces 16 and discharge opening 20.

Whereas outflow region 24 is embodied in the exemplifying embodiment merely as a collecting space having no further flow-influencing components, a flow-directing configuration 26, which encompasses two flow-directing sub-configurations 26a and 26b, is provided in inflow region 22. Only first flow-directing sub-configuration 26a, located farther upstream in flow incidence direction A, is evident in FIG. 2, since second flow-directing sub-configuration 26b is arranged above the drawing plane of FIG. 2.

Flow-directing sub-configuration 26a serves to distribute the cooling fluid flow, which enters module housing 12 through admission opening 18, as uniformly as possible in transverse direction Q over the entire width of module housing 12. First flow-directing sub-configuration 26a comprises for that purpose two diverging flow-directing walls 28a and 28b (see FIG. 2) that have an elliptical or lens-shaped cross-sectional conformation, as is evident from FIG. 2. Each of flow-directing walls 28a and 28b has a wall thickness that first increases in its longitudinal direction and then decreases after reaching a maximum thickness.

Second flow-directing sub-configuration 26b likewise comprises two flow-directing walls 30a and 30b that direct the cooling fluid, already distributed width-wise by first flow-directing sub-configuration 26a, in longitudinal direction L of module housing 12 (which coincides with stacking direction S), to individual flow spaces 16.

In the exemplifying embodiment, transverse direction Q and longitudinal direction L are orthogonal to one another and respectively to vertical direction H of module housing 12.

Flow-directing walls 28a and 28b of the first flow-directing sub-configuration constitute, in their region extending in inflow region 22, three flow regions 32a, 32b, and 32c in transverse direction Q of module housing 12 (see FIG. 2). Flow-directing walls 30a and 30b of second flow-directing sub-configuration 26b likewise constitute three flow regions 34a, 34b, and 34c between one another, between the upper flow-directing wall 30a and the battery cells 14, 14a, and 14b, and between the lower flow-directing wall 30b and the bottom 12c of module housing 12. The different flow regions 34a, 34b, and 34c of second flow-directing sub-configuration 26b each have associated with them a predetermined number of flow spaces 16 which can be reached by, and through which can flow, only the cooling fluid that has flowed through the respective flow region 34a, 34b, and 34c.

In order to define unequivocally the allocation of individual flow spaces 16 to flow regions 34a, 34b, and 34c, flow-directing walls 30a and 30b of second flow-directing sub-configuration 26b—which otherwise, except for a taper in their upstream longitudinal end region, have a constant thickness over their extent in a flow incidence direction—extend as far as a battery cell 14, so that the associated flow spaces 16 constitute a direct continuation of that flow space 34a, 34b, or 34c with which they are associated.

In the present case, flow regions 34b and 34c each have four flow spaces 16 associated with them, and flow region 34a has five flow spaces 16 associated with it. In order to ensure the most uniform possible flow conditions, the numbers of flow spaces associated with individual flow regions 34a to 34c preferably differ by no more than one flow space.

Flow-directing walls 30a and 30b extend in transverse direction Q of module housing 10 orthogonally to flow incidence direction A, between the two side walls 12d and 12e (see FIG. 2), over the entire width of module housing 12.

In a departure from what is depicted in FIG. 1, either a third flow-directing wall 30c can be encompassed by second flow-directing sub-configuration 26b in order to create similar flow conditions in all flow regions 34a, 34b, and 34c of second flow-directing sub-configuration 26b, or module housing 12 can be embodied in the lower region of its back wall 12b and in the region of its bottom 12c in accordance with the dashed-line wall 30c, in order to configure flow region 34c with a corresponding shape.

Thanks to the present arrangement of flow-directing walls in inflow region 22 of a battery module 10, battery cells 14 received in a module housing 12 of battery module 10 can experience a homogeneous flow of cooling fluid around them regardless of their physical distance from admission opening 18, and can thus be convectively cooled homogeneously.

Because the preferred application of the battery module described above is utilization thereof in a vehicle V, the present invention likewise relates to the vehicle V having a battery module according to one of the embodiments described above.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A battery module, having a module housing in which a plurality of battery cells are arranged in such a way that a flow space is formed between each two adjacent battery cells and/or between a peripheral battery cell and a wall portion, adjacent to the peripheral battery cell, of the module housing, through which space a cooling fluid can flow for convective cooling of the battery cells, the module housing having an admission opening for admitting cooling fluid into the module housing, and a discharge opening, different from the admission opening, for discharging cooling fluid from the module housing, there being provided, in an inflow region between the admission opening and the plurality of battery cells, a flow-directing configuration that subdivides the inflow region at least locally into different flow regions, wherein the flow-directing configuration comprises at least two flow-directing sub-configurations that are separate from one another, the at least two flow-directing sub-configurations include a first flow-directing sub-configuration and a second flow-directing sub-configuration, the first flow-directing sub-configuration being located farther upstream in a flow incidence direction than the second flow-directing sub-configuration, the first flow-directing sub-configuration including a first flow-directing wall arrangement and the second flow-directing sub-configuration including a second flow-directing wall arrangement, the first flow-directing wall arrangement being separate from the second flow-directing wall arrangement, the first flow-directing wall arrangement includes at least two diverging first walls that diverge relative to one another and the second flow-directing wall arrangement includes at least a first diverging second wall and a second diverging second wall, the first diverging second wall having a first downstream extent relative to the flow incidence direction and the second diverging second wall having a second downstream extent relative to the flow incidence direction, the first downstream extent being located farther upstream in the flow incidence direction than the second downstream extent, the first flow-directing sub-configuration having said at least two diverging first walls diverging in a first divergence direction, the second flow-directing sub-configuration having said first and second diverging second walls diverging in a second divergence direction, and wherein the first divergence direction is different from the second divergence direction.

2. The battery module according to claim 1, wherein the flow-directing configuration extends from an initial region, located closer to the admission opening, to the plurality of battery cells.

3. The battery module according to claim 1, wherein a plurality of flow regions selected from the different flow regions have associated with them a predetermined number of flow spaces that correlate with the associated flow region in terms of fluid mechanics in such a way that the cooling fluid flowing through the associated flow region can flow through them.

4. The battery module according to claim 3, wherein it is the case for at least one flow region of the plurality of flow regions that the flow spaces associated with a flow region have flowing through them only the cooling fluid flowing through the respective flow region.

5. The battery module according to claim 3, wherein it is the case for at least a substantial portion of the plurality of flow regions that the flow spaces associated with a flow region have flowing through them only the cooling fluid flowing through the respective flow region.

6. The battery module according to claim 3, wherein at least two of the plurality of flow regions have the same number of flow spaces respectively associated with them.

7. The battery module according to claim 1, wherein the at least two first walls having a first thickness that firstly increases in the flow incidence direction and decreases after reaching a maximum thickness and wherein the cooling fluid passes in the same general direction on either side of each of the at least two first walls, the first and second diverging second walls having a second thickness that is constant in the flow incidence direction.

8. The battery module according to claim 1, wherein the first and the second divergence direction are orthogonal to one another.

9. The battery module according to claim 1, wherein the at least two diverging first walls have at least at a downstream longitudinal end region of the first flow-directing sub-configuration a greater spacing from one another than at an upstream longitudinal end region of the first flow-directing sub-configuration, and wherein the first and second diverging second walls have at least at a downstream longitudinal end region of the second flow-directing sub-configuration a greater spacing from one another than at an upstream longitudinal end region of the second flow-directing sub-configuration.

10. The battery module according to claim 1, wherein the plurality of battery cells includes a group of battery cells that are all side-by-side one another, wherein the first diverging second wall and the second diverging second wall both direct the cooling fluid toward the group of battery cells that are all side-by-side one another.

11. The battery module according to claim 1, wherein the inflow region includes a first wall section and an opposition second wall section that partially defines the cooling fluid flow through the inflow region of the battery module, the at least two diverging first walls of the first flow-directing wall arrangement extending fully from the first wall section to the second wall section.

* * * * *